United States Patent [19]
Sizer, II et al.

[11] Patent Number: 6,021,324
[45] Date of Patent: *Feb. 1, 2000

[54] SYSTEM AND APPARATUS FOR CONTROLLING AN APPLIANCE SITUATED WITHIN A PREMISES USING PREMISES RECORDING UNIT

[75] Inventors: Theodore Sizer, II, Little Silver; Gregory Alan Wright, Colts Neck, both of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/486,543

[22] Filed: Jun. 8, 1995

[51] Int. Cl.$^7$ .................................................. H04Q 7/00
[52] U.S. Cl. ..................... 455/403; 364/492; 379/355; 379/102.01; 379/88.01; 379/67.1; 370/16; 348/6; 340/679; 395/200.3
[58] Field of Search ................................ 379/61, 66, 105, 379/64, 88, 56, 67, 102, 58, 102.01, 355; 395/200; 340/679; 455/403; 348/6; 320/16; 364/492

[56] References Cited

U.S. PATENT DOCUMENTS

| | | | |
|---|---|---|---|
| 4,058,678 | 11/1977 | Dunn et al. ................................. | 379/66 |
| 4,284,849 | 8/1981 | Anderson et al. . | |
| 4,442,319 | 4/1984 | Treidl ....................................... | 379/105 |
| 4,520,576 | 6/1985 | Vander . | |
| 4,701,945 | 10/1987 | Pedigo ...................................... | 379/64 |
| 4,885,766 | 12/1989 | Yasuoka et al. . | |
| 4,916,439 | 4/1990 | Estes et al. .............................. | 340/679 |
| 5,051,720 | 9/1991 | Kittirutsunetorn ......................... | 379/66 |
| 5,127,045 | 6/1992 | Cragun et al. ............................ | 379/88 |
| 5,138,649 | 8/1992 | Krisbergh et al. ......................... | 379/56 |
| 5,210,788 | 5/1993 | Nilssen ..................................... | 379/61 |
| 5,218,552 | 6/1993 | Stirk et al. ................................ | 364/492 |
| 5,414,751 | 5/1995 | Yamada .................................... | 379/58 |
| 5,414,756 | 5/1995 | Levine ...................................... | 379/67 |
| 5,434,973 | 7/1995 | Lu ............................................ | 395/200 |
| 5,544,222 | 8/1996 | Robinson et al. ......................... | 370/16 |
| 5,548,635 | 8/1996 | Bradley et al. ........................... | 379/102 |
| 5,553,123 | 9/1996 | Chan et al. ............................... | 379/102 |
| 5,583,933 | 12/1996 | Mark ........................................ | 379/355 |
| 5,623,531 | 4/1997 | Nilssen . | |
| 5,675,371 | 10/1997 | Barringer .................................. | 348/6 |

FOREIGN PATENT DOCUMENTS

| | | |
|---|---|---|
| 0 639 019 A1 | 2/1993 | European Pat. Off. . |
| 2 597 240 A1 | 10/1987 | France . |
| 2 229 022 | 9/1990 | United Kingdom . |

OTHER PUBLICATIONS

European Search Report (Date of Publication Jul. 22, 1998 A3).

Ryan JL, Home Automation, Electronics and Communication Engineering Journal, vol. 1, No. 4, Jul. 1989, London, pp. 185–192.

*Primary Examiner*—William Cumming
*Attorney, Agent, or Firm*—Eugene Rosenthal; Morgan & Finnegan, LLP

[57] ABSTRACT

A system and apparatus controls an appliance situated within a premises, such as a home or office. A premises recording unit is able to receive and store telephone information from a telephone network and includes a wireless transmitter for generating and transmitting a packet of control information to a premises appliance such as a coffee pot. An appliance controller is spaced from the premises recording unit, but within range of the generated packet transmission, for interfacing with the premises appliance. The appliance controller includes a packet receiver for receiving the packet of control information and is responsive to the information for controlling operation of the appliance.

29 Claims, 6 Drawing Sheets

SYSTEM AND APPARATUS FOR CONTROLLING AN APPLIANCE SITUATED WITHIN A PREMISES USING PREMISES RECORDING UNIT

This application is related to copending patent application entitled, "System and Apparatus For Controlling an Appliance Situated Within a Premises," filed on even date hereof by the same inventor.

FIELD OF THE INVENTION

This invention relates to a system and apparatus for controlling an appliance situated within a premises, such as a home or office with the use of a premises recording unit.

BACKGROUND OF THE INVENTION

Most ordinary answering machines are limited in function. They record a message and play it back at a later date. The advent of more sophisticated telephone network services in buildings and in the general population, as well as more sophisticated cable and telephone systems, allows greater potential for recording information, telephone messages and prompts transmitted into a recording unit from a communication channel operatively connected to a telephone network or cable system.

It has been proposed to have a premises recording unit which records sophisticated information such as caller identification, the time of call, downloaded video data, billing and credit information, interactive multimedia and other data. Such unit would separate the information and classify the main parts until analyzed later, such as on playback from the recording unit. It has also be proposed that some of the information such as the identification of the caller, the time of the call, and other pertinent information would be displayed on a video display such as a television set.

It would be advantageous if such proposed units were expandable so that the unit could be adapted to different services offered on a network. The premises recording unit preferably would have a premises phone operatively connected thereto so that the premises phone also would control various add-on functions of the unit. With such adaptability, the premises recording unit would have many capabilities for storing, retrieving, and displays on a monitor, such as a television set, whole or partial sections of information.

It would also be desirable if such a unit could also control other appliances within the premises so that the unit not only controls network functions in the premises phone, but also controlled other appliances contained within a premises, such as coffee pots, lights, and other appliances. A busy traveller coming in after a trip, or seated at a desk could quickly retrieve desired messages, as well as control various appliances within the home such as lights, coffee pots, toasters, stereos, security systems, thermostats and locks.

SUMMARY OF THE INVENTION

The present invention is advantageous because it now allows the control of appliances situated within a premises such as a home or office, by a premises recording unit which not only receives, stores, and then retrieves for display telephone information from a telephone network, but also allows control over appliances within a home or office. The present invention also allows control over appliances by a premises phone connected via a control channel to the premises recording unit. A user can converse on the telephone network, and then later control an appliance through use of the same premises phone.

In accordance with the present invention, a system and apparatus controls an appliance contained within a premises such as a home or office and includes a premises recording unit for receiving and storing telephone information from a telephone network. The premises recording unit includes a wireless transmitter for generating and transmitting a packet of control information to a premises appliance. An appliance controller is spaced from the premises recording unit, but within range of the generated packet transmission and interfaces with the premises appliance. The appliance controller also includes a packet receiver for receiving the packet of control information. The appliance controller is responsive to the received control information for controlling operation of the appliance.

In one aspect of the present invention, the wireless transmitter generates a packet radio signal. In another aspect of the present invention, the wireless transmitter generates an infrared signal. In still another aspect of the present invention, the wireless transmitter generates an ultrasonic signal to the appliance controller. The packet receiver is designed to receive respective signals as sent.

In another aspect of the present invention, the appliance controller generates a signal back to the premises recording unit relating to appliance operation. The premises recording unit is responsive to this generated feedback signal for transmitting further control information to the appliance controller, thus forming a closed loop control system.

The control information generated by the premises recording unit can be obtained from information received from the phone network such as when a user calls in, and by a series of DTMF tones, such as requesting that the coffee maker be turned on. When the traveler returns to the premises a few minutes later, the coffee is made and hot. A premises phone can also be connected to the premises recording, unit and the phone network. The premises recording unit can be responsive to DTMF tones generated from the premises phone so that one seated at a desk can conduct business over the phone, and then turn the coffee maker on. The premises phone can comprise a cordless phone unit.

In still another aspect of the present invention, the premises phone is connected to a phone network via a first communication channel and the premises recording unit is responsive to signals received from the premises phone along a second communication control channel extending between the premises phone and the premises recording unit. A switch is operatively connected to the premises phone, the telephone network and the premises recording unit for switching the premises phone from communication with the network over the first communication channel to control of the premises recording unit using signals generated by the premises phone and sent over the control channel to the premises recording unit. This in turn allows for control of transmission of the control signals to an appliance controller, thus controlling appliance operation.

In one aspect of the present invention, the first communication channel comprises a twisted pair wire and a carrier signal extending along the twisted pair wire having a first frequency range. The control channel comprises a subcarrier of a signal extending along the twisted pair wire having a second frequency range. In another aspect of the present invention, the first communication channel comprises a twisted wire pair and the control channel comprises a second twisted wire pair and a control signal extending along the second twisted wire pair. The switch is responsive to a predetermined dual tone multifrequency (DTMF) sequence received from the premises phone to switch the premises phone to communication with the premises recording unit via a second control channel.

In still another aspect of the present invention, the switch is responsive to a DTMF sequence only when a dial tone is present. The switch can be controlled by raising the premises phone off its hook. The premises recording unit also includes a ring detection circuit operatively connected to the switch and the premises recording unit. The switch is responsive to a predetermined number of rings to switch the call to the premises recording unit. The premises recording unit can also include voice recognition circuitry for responding to voice commands.

DESCRIPTION OF THE DRAWINGS

The foregoing and other features and advantages of the present invention will be appreciated more fully from the following description, with reference to the accompanying drawings in which.

DETAILED DESCRIPTION OF THE INVENTION

Figure 1:
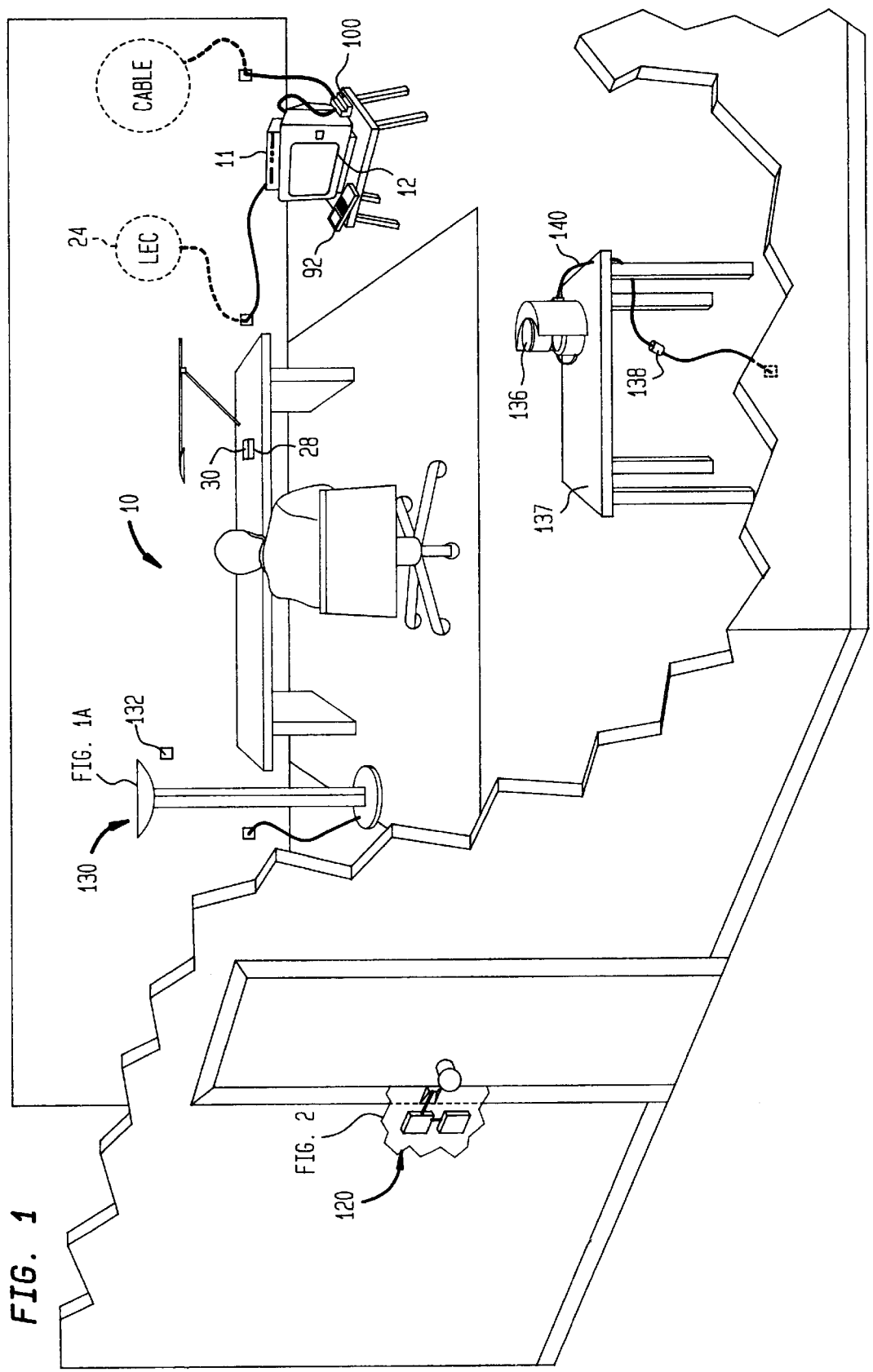
FIG. 1 is an environmental view of the system and apparatus of the present invention and shows control of the lights, a doorlock, television and coffee pot via a premises recording unit positioned on a television in the office.

Referring now to FIG. 1, there is illustrated generally at 10 a system of the present invention for controlling an appliance situated within a premises such as a home or office. In the illustrated embodiment, a premises recording unit 11 is positioned on a television 12, and receives and stores telephone information received from a telephone network.

As will be explained in detail below, the premises recording unit 11 includes a wireless transmitter for generating and transmitting a packet of control information such as by infrared, radio or ultrasound to a premises appliance which can be a light, coffee pot, television, doorlock or any other appliance which can be controlled. An appliance controller is spaced from the premises recording unit, but within range of the generated packet transmission and interfaces with the premises appliance. The appliance controller can comprise an off-on switch for a coffee maker or electromechanical relay for a doorlock. The appliance controller includes a packet receiver which receives the packet of control information. The appliance controller is responsive to the information and controls operation of the appliance such as turning the coffee pot or light off and on, or locking and unlocking the door. The premises recording unit can be controlled via a premises phone for controlling operation of the appliance. This is advantageous for busy individuals, such as business people who are often on the phone, such as a cordless phone, and desire to quickly control certain appliances without getting up from their seat as shown.

Figure 3:
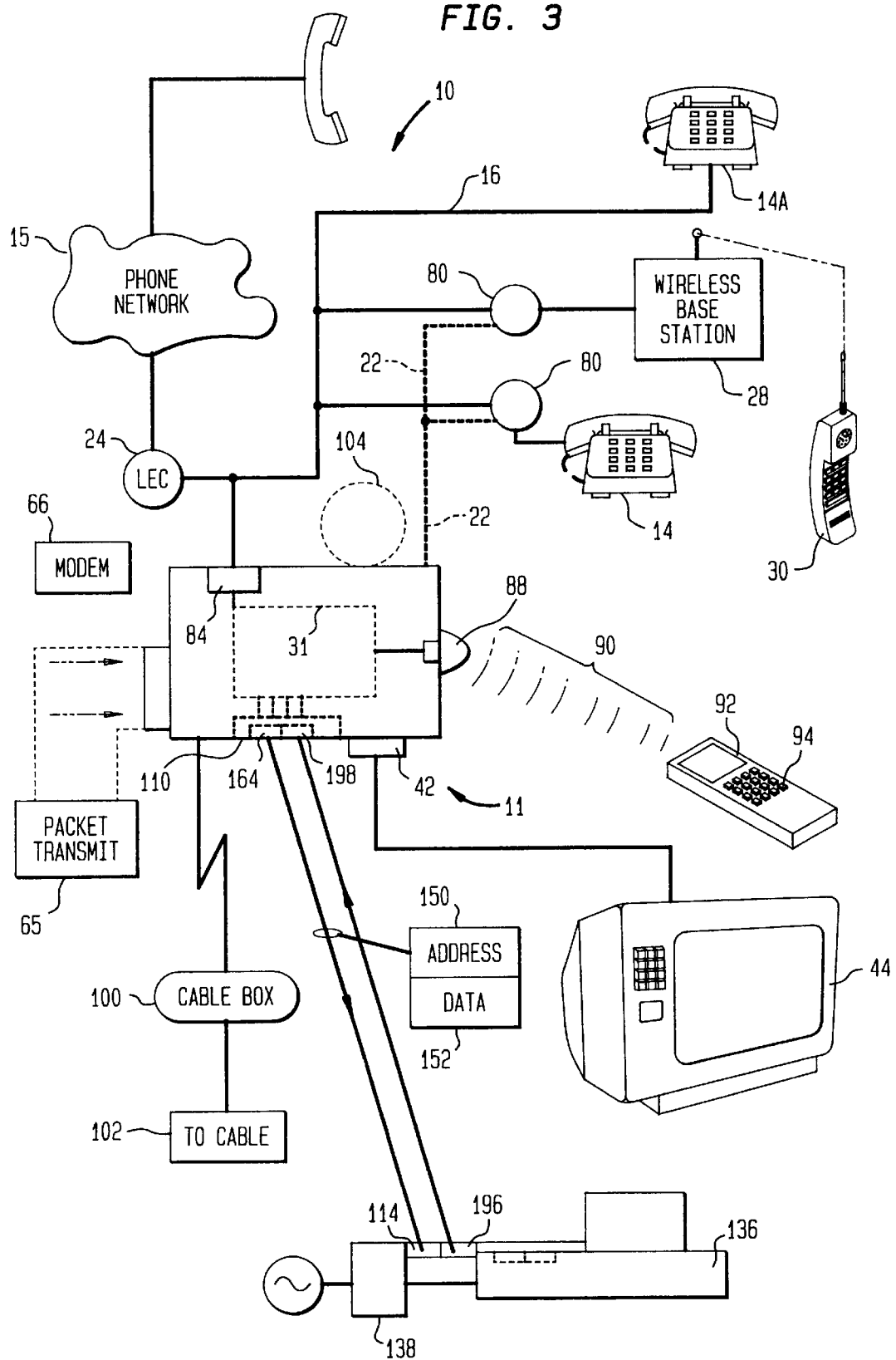
FIG. 3 is a schematic environmental view of the system and apparatus of the present invention that controls an appliance contained within a premises such as a home or office.

For purposes of clarity, a detailed description is first given of the premises recording unit (11 in FIG. 1), followed by a description of the system (10 in FIG. 1). As shown in FIG. 3, at least one premises phone 14 is connected to a phone network 15 via a first communication channel 16. The premises phone 14 also controls the premises recording unit 11, by transmitting control signals through a second communication control channel 22 (also known as an incoming control line) extending between the premises phone 14 and the premises recording unit 11.

As shown in FIG. 3, at least two premise phones 14 and 14a are shown in the home environment known as the premises and are connected to the local office (LEC) 24 of the phone network 15 via the first communication channel 16. As illustrated, a wireless base station 28 is connected to the first communication channel 16 and works with a hand-held cordless telephone 30. One of the premises phones 14a, does not connect to the second communication channel 22, so that it bypasses the premises recording unit 11.

The illustrated embodiment shows the premises phones 14, and 14a operatively connected to a phone network 15, which includes a local office (LEC) 24. The phone network 15 can also be a local phone network or other local area network in a building or other environment.

Figure 4:
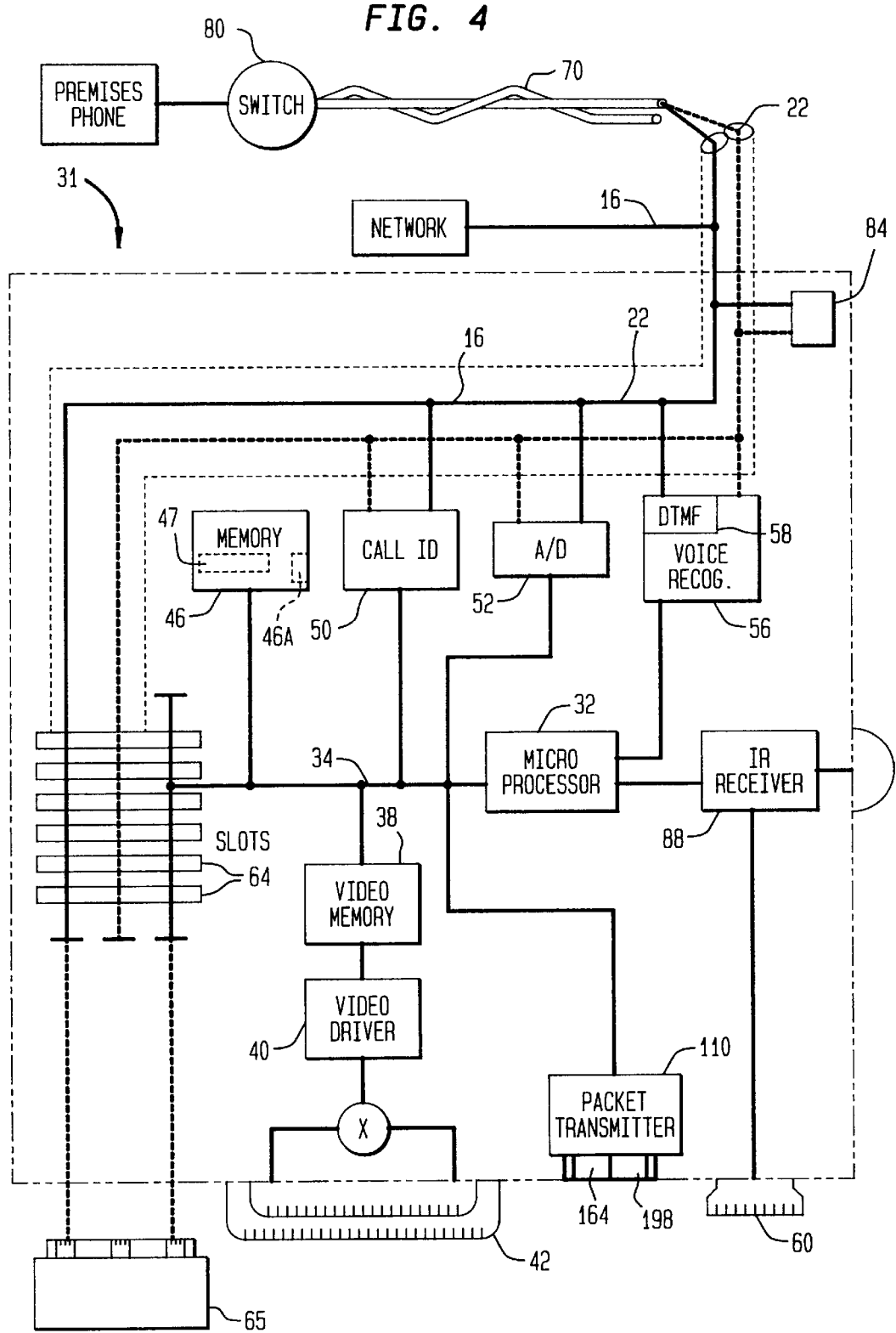
FIG. 4 is a high level block diagram of the system in accordance with the present invention.

Referring now in greater detail to FIG. 4, the premises recording unit 11 records information, phone messages, and prompts received from the network along the first communication channel(16 in FIG. 3). The premises recording unit 11 which includes a microprocessor 32 connected to a digital bus 34. The premises recording unit 11 also includes a video memory circuit 38 and a video driver circuit 40 which are connected along the digital bus 34 to the microprocessor via the bus 34 at one end and to a standard video interface connector port 42 at the other end.

The premises recording unit 11 connects via a video interface connector port 42 with a video display such as a television set (12 in FIG. 1) to display stored information, telephone messages and prompts received from control signals such as from a premises phone or a network phone. The premises recording unit 11 also includes a memory 46 for storing digital information. The memory can be RAM 47 or other known memory devices. The memory 46 is connected to the digital bus 34. Data is withdrawn from memory 46 when instructed by the microprocessor 32. A database of caller identifications can be maintained in a memory database 46a. The information in this database 46a can include other information such as addresses or business information of potential callers which is displayed when the caller is identified.

Also in the premises recording unit, caller ID circuitry 50 is connected to the bus 34 and identifies any caller ID information in a telephone call such as is conventionally known. An analog-to-digital converter 52 converts incoming analog signals on the first and second communication channels (16 and 22) to digital data for storage in memory 46 and further processing by the microprocessor 32. The premises recording unit (11) also includes voice recognition circuitry 56 for responding to voice commands. This voice recognition circuitry connects to the microprocessor 32 and both the first and second communication channels 16, 22. The voice recognition circuitry 56 also includes Dual Tone Multifrequency (DTMF) tone detection circuitry 58 connected to the first and second communication channels 16, 22 which extend to the phone network 15 and premises phone 14. This DTMF circuitry 58 detects tones used as control signals generated from either a premises phone 14 or a phone connected to the phone network 15. Those tones used as control signals instruct the microprocessor 32 to control processing and memory by recording or retrieving messages or displaying messages on the television (12 in FIG. 1) through the video memory and driver circuits 38, 40. A serial connection port 60 connects to the microprocessor 32 and allows connection to modems and other serial devices.

The digital bus 34 includes an expansion bus 62. A plurality of slots 64 are positioned in the housing for receiving various cartridges 65 for insertion within the slots 64 for connection to the expansion bus 62. One such cartridge could be a packet transmitter cartridge illustrated at 65, which generates and transmits packets of control information by packet radio signal, infrared, or ultrasonic. The expansion bus 62 allows expansion of various functions of the premises recording unit 11. This is advantageous especially since advances are quickly made in the telephone services industry, which offer new services continually. Thus, updating is often required. When an appropriate cartridge is used, faxes as well as E-mail messages can be created. Other cartridges 65, such as modem or game cartridges can be used.

In accordance with the present invention, the premises recording unit 11 is responsive to signals received from a premises phone 14 along the second communication control channel 22 (also control line 22) extending between the premises phone 14 and the premises recording unit 11. In accordance with the present invention, the first communication channel can comprise a twisted pair of wire 70 and a carrier signal having a first frequency range. The second communication control channel 22 can comprise a subcarrier channel along the twisted pair of wire 70 and having a second frequency range, such as about 100 KHz. As an alternative, an additional twisted pair which exists in some homes can be used for the second communication control channel 22 if a second twisted wire pair is connected throughout the home or business premises.

As shown in FIG. 4, a switch 80 is operatively connected to the premises phone 14, the phone network 15, and the premises recording unit 11 for switching the premises phone 14 from communication with the phone network 15 along the first communication channel 16 and control of the premises recording unit 11 through control signal generation by the premises phone 14 through the second communication channel 22 to the premises recording unit 11. Each phone (14, and 14a in FIG. 3) has a respective switch 80. The switches 80 can be responsive to a predetermined Dual Tone Multifrequency Tone (DTMF) sequence received from the premises phone 14 to switch the premises phone to communication with the premises recording unit 11 via the second communication control channel 22. The switch 80 can also be controlled by picking the premises phone off the hook.

The premises recording unit 11 also can be responsive to DTMF tones generated over the phone network 15 to retrieve and prompt audio messages from the premises recording unit. This is advantageous when the user is geographically spaced from the premises and desires to obtain audio messages and prompts. A ring detection circuit 84 can be operatively connected to the premises recording unit 11 and the switch 80. The ring detection circuit 84 can be responsive to a predetermined number of rings and allows the premises recording unit 11 to answer the call if the call is not answered by a user of the premises phone.

The video display such as the television (12 in FIG. 1) preferably displays the identification of the caller, the caller's name, the time of the call, and the telephone number. Additionally, if any messages were left, the messages could be heard through the TV speaker or a separate speaker attached to the premises recording unit 11.

Referring now to FIG. 3, the premises recording unit 11 includes an infrared receiver 88 to obtain and receive infrared control signals 90 generated from a premises control unit 92. The premises control unit 92 can be a hand held remote control device with a keypad 94. The infrared premises control unit 92 can be preprogrammed so that a select sequence of depressed buttons on the keypad causes selected functions of the premises recording unit 11 to be displayed on the television 12.

A cable loop-through can be provided by the cable Set Top Box 100 which can be connected to the premises recording unit 11 for communication with the cable company 102. Looping through the cable and downloading a game can provide greater speed. A separate modem/fax cartridge 66 can also be inserted within the expansion slot 64. Any modem can include decompression and compression and hardware and software.

Also, the premises recording unit 11 can be controlled by a selected DTMF sequence from a network phone 8, such as an outside caller. The premises recording unit 11 can be programmed to give prerecorded answers. An additional memory system (not shown) could provide prerecorded responses, such as prompts, for instructing the caller of how to respond to retrieve messages in or out of the home. The premises recording unit can also include an onboard display 104.

Referring once again to FIG. 4, the description will proceed with an explanation of the packet transmitter and appliance controller which allows the premises recording unit 11 to control an appliance.

The premises recording system 11, in accordance with the present invention, includes a packet transmitter 110 for receiving control information concerning control of a particular appliance and generating and transmitting a packet of information to an appliance controller indicated generally at 112, which is interfaced with the desired appliance. The appliance controller 112 includes a packet receiver 114 which receives the packet signal for processing.

Figure 1A:
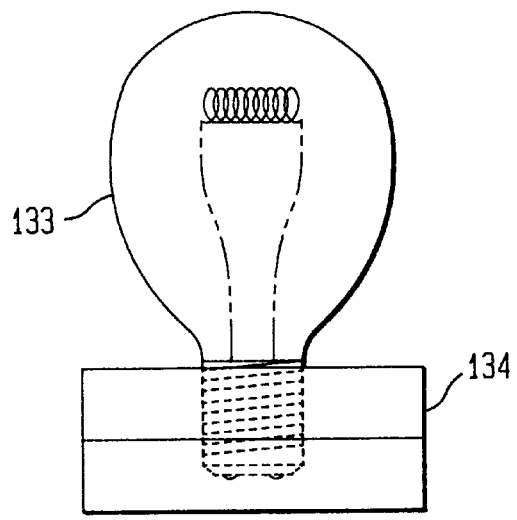
FIG. 1A is an enlarged view of the bulb screwed into series connection appliance controller.
Figure 2:
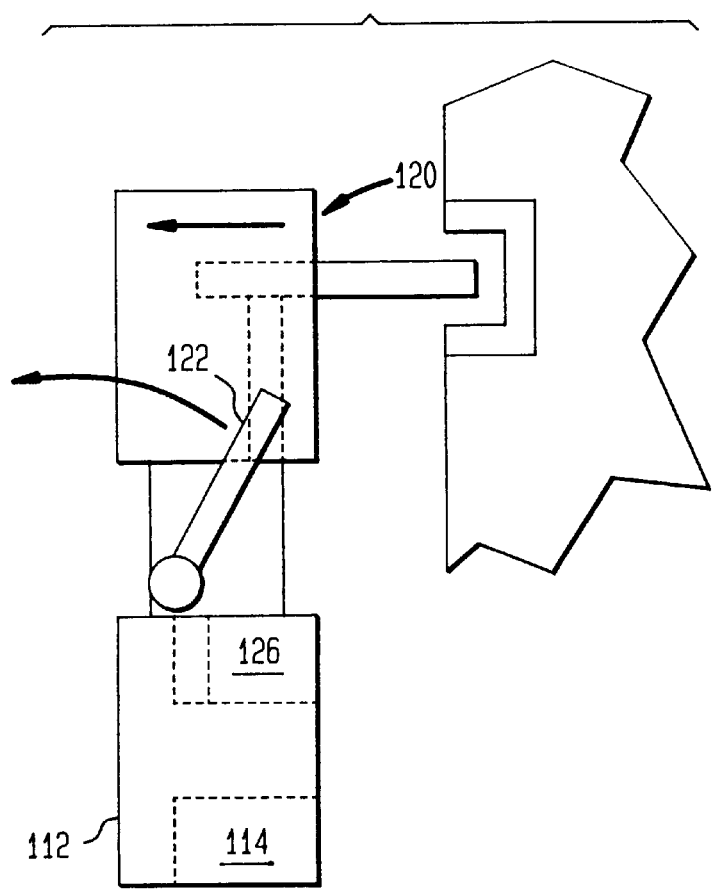
FIG. 2 is an enlarged schematic diagram of the lock and a lock controller used for controlling locks on the entrance door.

FIGS. 1, 1A and 2 illustrate four separate appliances which are controlled by the premises recording unit 11. In FIG. 2, the door lock 120 includes an elctromechanical relay 122 connected to an appliance controller 112, which triggers the electromechanical relay 122 when a packet control signal is received. With this type of locking device and appliance controller 112, a packet radio signal is especially advantageous so that the controller can be triggered when there is no direct line of sight or ceiling bounce line of sight such as necessary with an infrared signal. The appliance controller 112 can also include a transmitter 126 for generating a signal back to the premises recording unit (11 in FIG. 1), which signals the locked or unlocked condition of the entrance door, thus forming a closed loop control system. This would be advantageous for a home owner. If one is in bed upstairs, an initial instruction could be sent via the premises telephone 14 to the premises recording unit 11, instructing the premises recording unit to send a lock signal to door. The feedback signal then would verify if the door were locked.

Other controlled appliances shown in FIGS. 1 and 1A include a pole lamp 130 controlled by a switch 132 on the wall. In this particular embodiment, the switch 132 is left in its "on" state and the bulb 133 is screwed into a separate series connection appliance controller 134 which allows current flow to the bulb only when a packet control signal is transmitted.

A coffee maker 136 is positioned on a table 137 within the premises, and has a series connector appliance controller 138 positioned in the power cord 140. The coffee maker 136 is normally left on, and the packet control signal operates the appliance controller 138 to allow current flow to the coffee maker.

The television 12 operation is controlled directly by the premises recording unit 11, and this can be controlled via a premises or outside phone.

Referring now to FIGS. 1 and 3, these appliances can all be controlled from within or without the premises. For example, the user could make a phone call to the premises and after a predetermined number of rings, the premises recording unit 11 answers and prompts the user. Based on a preprogrammed DTMF sequence, the user can activate the signal packet transmitter 110 (FIG. 3) and send a packet signal to the coffee maker 136 (FIG. 1). The packet signal includes an address portion 150 (FIG. 3), which signifies the coffee maker appliance controller 138 (FIG. 1) as the proper recipient of the packet, and the data portion 152 (FIG. 3), which signifies the desired instructions, which includes allowing current to flow to the coffee maker 136 (FIG. 1). When the busy traveler arrives home, the coffee is perked and warm. Also, as the traveler enters his driveway, he could call into his house by his cellular mobile phone, and after appropriate prompts and DTMF generated tones, request that a packet signal be transmitted from the premises recording unit 11 unlocking the door as illustrated in FIG. 2.

Referring now to FIG. 4, depending on the particular design and desired end uses, the packet transmitter 110 (FIG. 1) can be an infrared transmitter, which generates a packet of information, or a radio transmitter and even an ultrasonic sound transmitter. The transmitter 110, can be positioned on a circuit board and operatively connected to the internal bus 34, thus forming an integral part of the bus 34 and premises recording unit 11. Additionally, the packet transmitter can be formed on a cartridge 65 and inserted within a slot 64.

Figure 5:
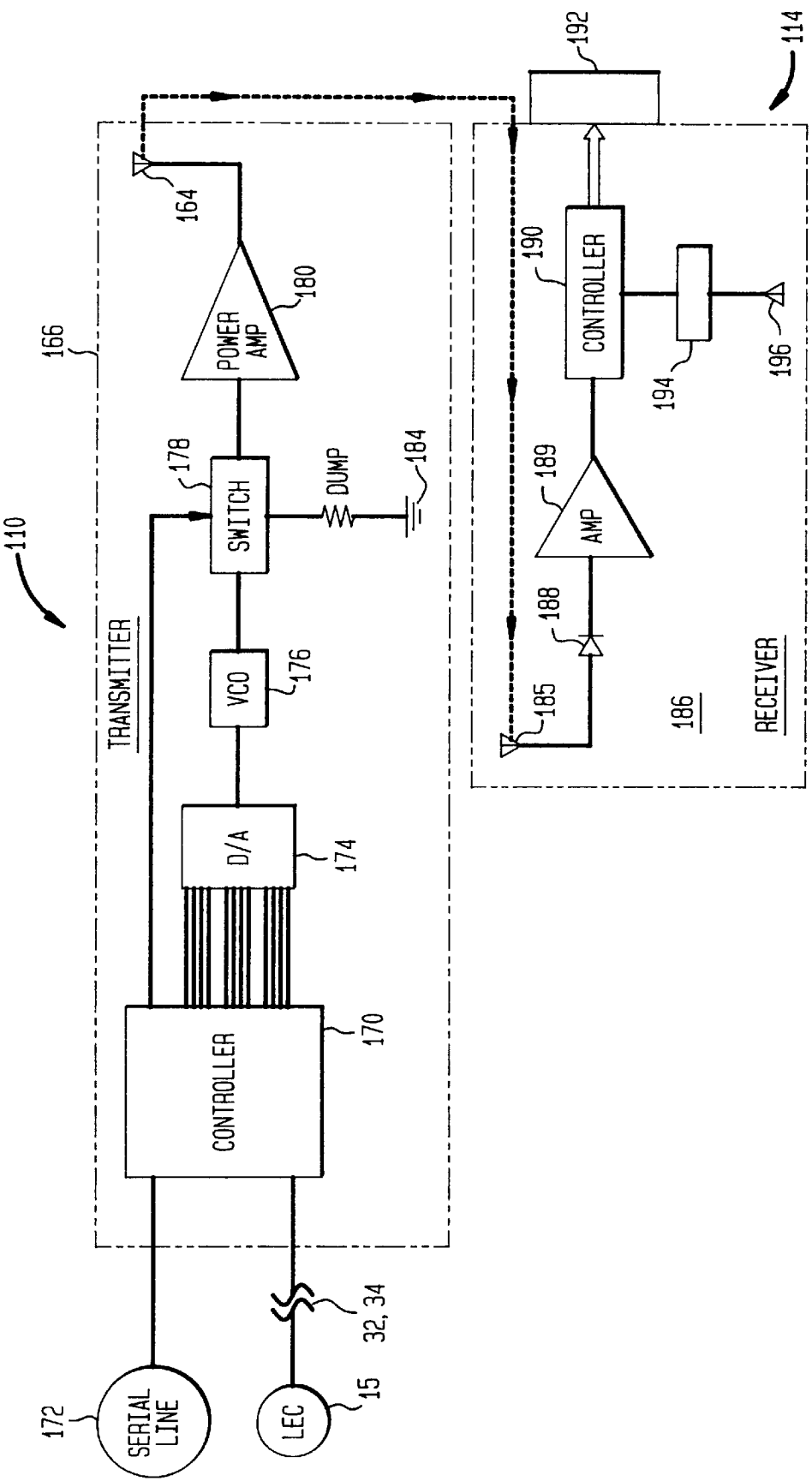
FIG. 5 is a high level block diagram of the transmitter and packet receiver used with the appliance controller used in the system of the present invention.

Referring now to FIG. 5, the description will now proceed with a brief description of one type packet radio transmitter 110 which can be used with the present invention. The types of packet transmitters which can be used with the invention vary and are chosen by those skilled in the art biased on the desired functions and end use.

In one aspect of the present invention, the transmitter preferably works in an operating frequency of about 2.45 GHz to about 6.0 GHz. Naturally, this frequency can vary. This operating frequency is desirable since it is presently unlicensed, underpopulated, and requires only a very small transmitting antenna 164 which can be attached directly to a circuit board.

As illustrated in FIG. 3, once generated and transmitted, the packet of control information contains an address portion 150 corresponding to which appliance is to be controlled, and a data portion 152 The address portion 150 notes a particular appliance controller interfaced with the particular appliance for which the packet receiver of the controller is to receive the data. This could include the appliance controller 138 interfaced with the coffee pot 136 shown in FIG. 1.

As illustrated in FIG. 2, the appliance controller, e.g. the illustrated lock controller, can also include a transmitter 126, such as for transmitting feedback information by radio or infrared to the premises recording unit (11 in FIG. 1), thus forming a closed loop control system. For example, in the lock of FIG. 2, data can be generated back to the premises recording unit 11 whether the lock is in an unlocked or locked position. The same can be done with the coffee maker 136 of FIG. 1 where data can be generated back to the premises recording unit concerning the temperature of the coffee.

Referring now to FIG. 5, there is illustrated one embodiment of a transmitter 110 and packet receiver 114 of the present invention. As shown in FIG. 5, an electronic controller 170 is positioned on a circuit board 166. A serial line 172 can be connected into the electronic controller 170 and can receive information such as from a modem or other source. Control information is received from the microprocessor 32 as part of the program generated within the memory 46 or from the premises phone or even the network. The electronic controller 170 inputs signals directly to a digital to analog (D/A) converter 174 and then to a voltage controlled oscillator (VCC)) 176 and then into a switch 178. From the switch 178, the signal is then transmitted to a power amplifier 180 which then amplifies the signal for transmission to the packet receiver via an antenna 164 positioned on the circuit board 166. Extraneous signals can be dumped via circuit 184.

The transmitted signal is then sent to the packet receiver 114 of the appliance controller 112 and received by a receiver antenna 185 positioned on a circuit board 186. The received signal is then forwarded to a diode detector 188 which rectifies the signal. The signal is then amplified by a power amplifier 189 and sent to an electronic controller 190, which then drives an appliance controller interface 192 which could be an on/off switch as for lights or coffee pot or any other type of device such as the described electromechanical linkage for opening the lock of a door as shown in FIG. 2. Additionally, as illustrated in FIGS. 3 and 5, a separate transmitter 194 can transmit information via separate antenna 196 back to a receiving antenna 198 of the transmitter 110 forming a closed loop control system.

In another potential embodiment, the radio transmitter can deliver a packet of digital information to a separate subset unit spaced from the premises recording unit. This subset unit has a circuit board with a patch antenna positioned thereon. The signal is received and rectified via a diode and then amplified via an audio amplifier. The signal then progresses to a microprocessor which retransmits the information as an infrared pulse sequence through an LED to the appliance to be controlled. This appliance could be for example a VCR or other device such as a stereo which receives signals from an infrared controller. Conversion data to convert the radio data sequence to the infrared post sequence can be entered in a simple onboard memory (ROM) and can be easily tailored to different manufacturer's pulse sequences, thus allowing a unique radio packet sequence to result in a similar response for any manufacture's appliance.

In the simplest form the detected radio signal can directly modulate the infrared LEDs with no conversion at all. The unit can be placed next to the appliance to be controlled and little optical power would be required. In this manner, a low-cost, low-power, battery operated link could be established.

Figure 6:
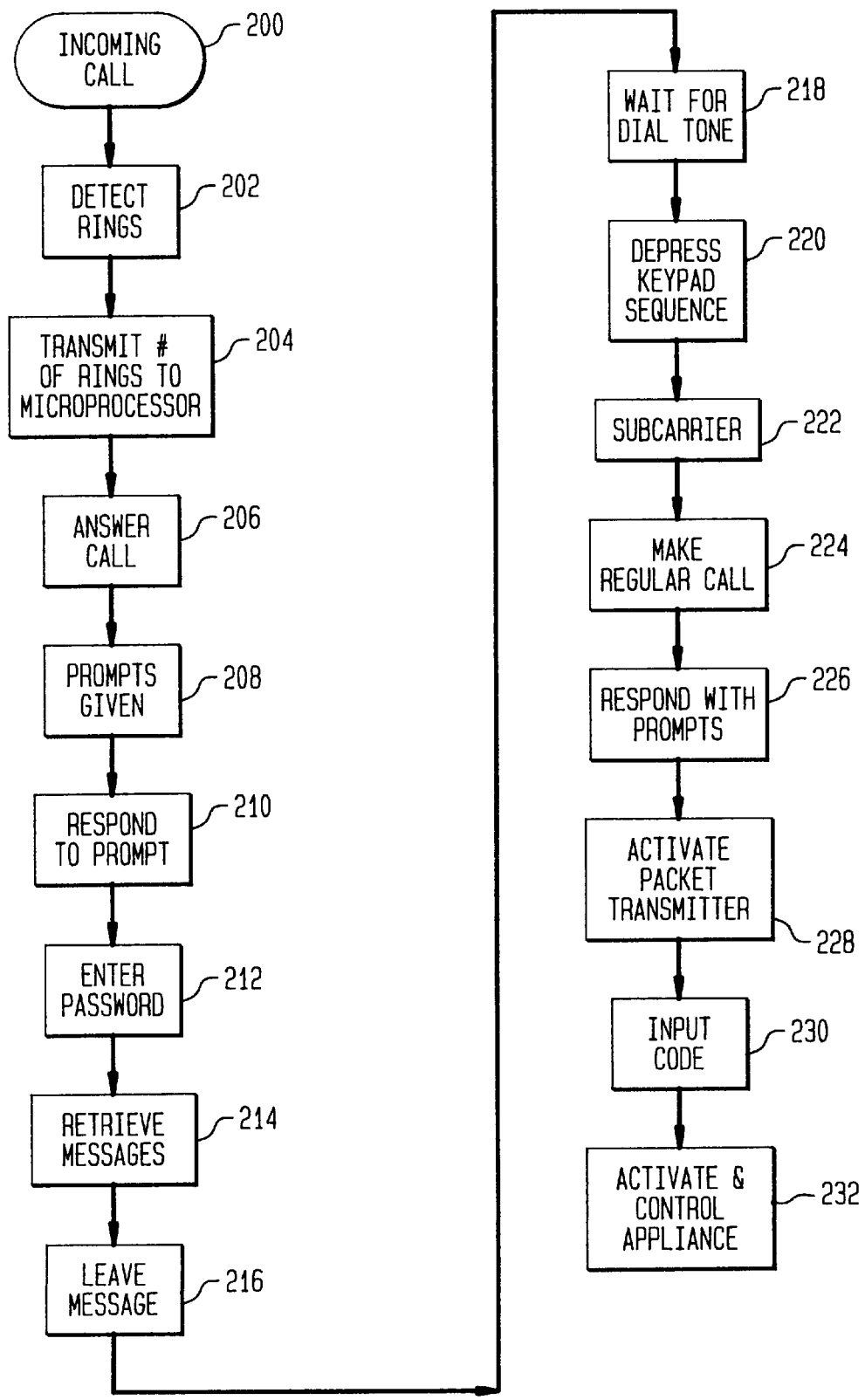
FIG. 6 is a high level flow chart depicting one sequence of possible steps for using the system of the present invention for controlling an appliance.

The flow chart of FIG. 6 in conjunction with FIG. 4 illustrates the steps of one aspect of the invention. For purposes of understanding, the description will proceed relative to an initial phone call coming from the phone network 15. The blocks of the flow chart are numbered with numerals starting in the 200 series for clarity. There are enumerable different possible steps and sequences for the system of the present invention and the following scenario is only one example.

A call initially comes into the premises (Block 200). The ring detection circuit 84 detects the number of rings (Block 202) and transmits this information to the microprocessor 32 (Block 204). In response to the ring detection circuit, the microprocessor generates instructions to other components so that the call is answered (Block 206). A menu is given asking for several prompts (Block 208). The caller can respond by a selected keypad sequence, such as **T*, or any other desired prompts (Block 210), and the outside caller can retrieve messages if a certain password is entered based on instructed prompts (Block 212). Selected messages recorded in memory then can be retrieved (Block 214). The network caller can also leave a message (Block 216).

When the premises user returns, the user initially picks up the receiver from the premises phone and waits for a dial tone (Block 218). If there is a dial tone (Block 220), the user depresses a predetermined keypad sequence, which activates the switch 80 so that the DTMF tones are carried along a subcarrier channel 22 of the twisted pair wire (Block 222). Alternately, a regular call can be made (Block 224). The switch has corresponding translation software and hardware to ensure that frequency generation occurs for the subcarrier channel when used. The premises recording unit 11 can then respond with prompts for message retrieval as before (Block 226).

Once prompts are retrieved, the user, once seated at his desk, can then activate control of the premises recording unit for activating control of various appliances. The premises user then presses a predetermined DTMF code sequence, which then activates the transmitter and premises recording unit (Block 228). The user then inputs a predetermined code (Block 230), which then activates the transmitter to send a packet of information to an appliance controller, such as an on/off switch of a light or even a coffee maker (Block 232). Thus, the user not only can retrieve messages while seated by using a premises phone, but also can operate various appliances throughout the office by that phone.

It is to be understood that the above description is only one preferred embodiment of the invention. Numerous other arrangements may be devised by one skilled in the art without departing from the spirit or scope of the invention.

That which is claimed is:

1. A system for controlling an appliance situated within a premises comprising:
   premises recording means within the premises for receiving a call originated by a telephone connected to a telephone network at a location that is external to said premises and storing telephone information from said telephone, the premises recording means including conversion means for converting said telephone information to control information and wireless transmission means for generating and transmitting a packet of said control information to a premises appliance, the packet having a transmission format including an address portion to identify a particular premises appliance and a data portion for said control information; and
   appliance control means spaced from said premises recording means but within range of said generated packet transmission for interfacing with the premises appliance, said appliance control means including:
      means for receiving said packet of said control information and being responsive to said control information for controlling operation of the appliance; and
      means for generating a signal back to said premises recording means relating to appliance operation, wherein said premises recording means is responsive to said generated signal for transmitting further control information to said appliance control means.

2. The system according to claim 1 wherein said wireless transmission means comprises means for generating a packet radio signal to said appliance control means.

3. The system according to claim 1 wherein said wireless transmission means comprises means for generating an infrared signal to said appliance control means.

4. The system according to claim 1 wherein said wireless transmission means comprises means for generating an ultrasonic signal to said appliance control means.

5. The system according to claim 1 wherein said packet of control information generated by said premises recording means is obtained from information received from said telephone.

6. The system according to claim 1 wherein said wireless transmission means is responsive to information received from said telephone.

7. The system according to claim 1 including a premises phone connected to premises recording means and said phone network, and wherein said premises recording means is responsive to DTMF tones generated from said premises phone.

8. The system according to claim 1 wherein said premises phone comprises a cordless phone unit.

9. A system for controlling an appliance situated within a premises comprising:
   a premises phone connected to a phone network via a first communication channel;
   premises recording means within the premises for receiving and storing telephone information from the premises phone over the first communication channel, including wireless transmission means for generating and transmitting a packet of control information to the premises appliance, said premises recording means being responsive to signals received from said premises phone along a control channel extending between said premises phone and said premises recording means, the packet having a transmission format including an address portion to identify a particular premises appliance and a data portion for said control information;
   appliance control means spaced from said premises recording means but within range of said generated packet transmission for interfacing with the premises appliance, said appliance control means including:
      means for receiving said packet of control information and being responsive to said information for controlling operation of the appliance;
      means for generating a signal back to said premises recording means relating to appliance operation, wherein said premises recording means is responsive to said generated signal for transmitting further control information to said appliance control means; and
   switch means operatively connected to said premises phone, said network and said premises recording means for switching said premises phone from communication with said telephone network over said first communication channel to control of said premises recording means using signals generated by said premises phone and sent over said control channel to said premises recording means for controlling transmission of control signals and thus controlling appliance operation by said premises phone.

10. The system according to claim 9 wherein said wireless transmission means comprises means for generating a packet radio signal to said appliance control means.

11. The system according to claim 9 wherein said wireless transmission means comprises means for generating an infrared signal to said appliance control means.

12. The system according to claim 9 wherein said wireless transmission means comprises means for generating an ultrasonic signal to said appliance control means.

13. The system according to claim 9 wherein said packet of control information generated by said premises recording means is obtained from information received from said phone network.

14. The system according to claim 9 wherein said premises phone comprises a cordless phone unit.

15. The system according to claim 9 wherein said first communication channel comprises a twisted pair wire and a carrier signal extending along said twisted pair wire having a first frequency range, and said control channel comprises a subcarrier signal extending along said twisted pair wire having a second frequency range.

16. The system according to claim 9 wherein said first communication channel comprises a twisted wire pair and said control channel comprises a second twisted wire pair and a control signal extending along said second twisted wire pair.

17. The system according to claim 9 wherein said switch means is responsive to a predetermined dual tone multifrequency tone (DTMF) sequence received from said premises phone to switch said premises phone to communication with said premises recording means via said control channel.

18. The system according to claim 17 wherein said switch means is responsive to said DTMF sequence only when a dial tone is present.

19. The system according to claim 9 wherein said switch means is controlled by raising the premises phone from off its hook.

20. The system according to claim 9 include ring detection means operatively connected to said premises recording means and said switch means, wherein said switch means is responsive to a predetermined number of rings to switch the call to the premises recording means.

21. The system according to claim 9 wherein said premises recording means includes voice recognition circuitry for responding to voice commands.

22. The system according to claim 9 wherein said premises recording means includes infrared sensing means for enabling control of said premises recording means via an infrared signal.

23. The system according to claim 9 wherein said system includes a plurality or premises phones and a respective switches corresponding to a respective premises phone.

24. An apparatus for controlling an appliance situated within a premises comprising:

premises recording means within the premises for receiving a call originated by a telephone connected to a telephone network at a location that is external to said premises and storing telephone information from said telephone;

conversion means for converting said telephone information to control information; and wireless transmission means for generating and transmitting a packet of said control information in a signal to an appliance controller which is spaced from said premises recording means but within range of the generated packet transmission for controlling operation of the appliance via the generated signal, the packet having a transmission format including an address portion to identify a particular premises appliance and a data portion for said control information, wherein said premises recording means includes means for receiving a feedback signal generated from said appliance controller, said premises recording means being responsive to said generated signal for transmitting further control information to said appliance controller.

25. An apparatus according to claim 24 wherein said wireless transmission means comprises means for generating a packet radio signal to said appliance control means.

26. An apparatus according to claim 24 wherein said wireless transmission means comprises means for generating an infrared signal to said appliance control means.

27. An apparatus according to claim 24 wherein said wireless transmission means comprises means for generating an ultrasonic signal to said appliance control means.

28. An apparatus according to claim 24 wherein said packet of control information generated by said premises recording means is obtained from information received from said telephone connected to said telephone network.

29. An apparatus according to claim 24 wherein said premises recording means includes means for connecting to a premises phone and a phone network, and wherein said premises recording means is responsive to DTMF tones generated from said premises phone when connected thereto.

* * * * *